United States Patent
Pan et al.

(10) Patent No.: US 8,006,023 B1
(45) Date of Patent: Aug. 23, 2011

(54) DRIVER BASED WIRELESS USB

(75) Inventors: Qi Pan, Shanghai (CN); Milind Kopikare, San Jose, CA (US); Raja Banerjea, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 55 days.

(21) Appl. No.: 12/436,577

(22) Filed: May 6, 2009

Related U.S. Application Data

(60) Provisional application No. 61/053,520, filed on May 15, 2008, provisional application No. 61/075,578, filed on Jun. 25, 2008.

(51) Int. Cl.
*G06F 13/20* (2006.01)

(52) U.S. Cl. .......................... 710/313; 710/315

(58) Field of Classification Search .......... 710/300–315, 710/62–64, 72, 110, 268
See application file for complete search history.

(56) References Cited

U.S. PATENT DOCUMENTS

| | | | |
|---|---|---|---|
| 7,149,834 B2 * | 12/2006 | Peters et al. ................. | 710/300 |
| 7,334,072 B1 * | 2/2008 | Wright ......................... | 710/315 |
| 7,478,188 B2 * | 1/2009 | Patton .......................... | 710/300 |
| 7,685,322 B2 * | 3/2010 | Bhesania et al. .................. | 710/8 |
| 7,689,753 B2 * | 3/2010 | Kwak et al. ................... | 710/305 |
| 2008/0215773 A1 * | 9/2008 | Christison et al. ............. | 710/62 |
| 2008/0215774 A1 * | 9/2008 | Kim et al. ...................... | 710/62 |

OTHER PUBLICATIONS

"Information Technology—Telecommunications and Information Exchange Between Systems—Local and Metropolitan Area Networks—Specific Requirements", *IEEE*, Wireless LAN Medium Access Control (MAC) and Physical Layer (PHY) Specifications,(Aug. 20, 1999).

* cited by examiner

*Primary Examiner* — Raymond N Phan

(57) ABSTRACT

Wireless USB connection techniques are described. In one or more implementations, a Universal Serial Bus (USB) device includes one or more modules configured to communicate data over a wireless USB connection to another USB device. The wireless USB connection is implemented by mimicking a wired USB connection.

21 Claims, 10 Drawing Sheets

```
                    502
                  /      508
                 /  504  /
                /  /  506 /  510   512                  514
         0     /  /  /   /  /     /    1            2  /             3
         0 1 2 3 4 5 6 7 8 9 0 1 2 3 4 5 6 7 8 9 0 1 2 3 4 5 6 7 8 9 0 1
         +-+-+-+-+-+-+-+-+-+-+-+-+-+-+-+-+-+-+-+-+-+-+-+-+-+-+-+-+-+-+-+-+
         |V=2|P|X|  CC   |M|     PT      |       sequence number         |
         +-+-+-+-+-+-+-+-+-+-+-+-+-+-+-+-+-+-+-+-+-+-+-+-+-+-+-+-+-+-+-+-+
         |                           timestamp 516                       |
         +-+-+-+-+-+-+-+-+-+-+-+-+-+-+-+-+-+-+-+-+-+-+-+-+-+-+-+-+-+-+-+-+
         |            synchronization source (SSRC) identifier 518       |
         +=+=+=+=+=+=+=+=+=+=+=+=+=+=+=+=+=+=+=+=+=+=+=+=+=+=+=+=+=+=+=+=+
```

Fig. 5

DRIVER BASED WIRELESS USB

RELATED APPLICATION

This application claims priority under 35 U.S.C. §119(e) to U.S. Provisional Application Ser. No. 61/053,520, filed on May 15, 2008 and to U.S. Provisional Application Ser. No. 61/075,578, filed on Jun. 25, 2008, the disclosures of both provisional applications are hereby incorporated by reference in their entirety.

BACKGROUND

Universal Serial Bus (USB) functionality has been adopted by a wide range of devices to provide communicative coupling. For example, a personal computer (PC) may use USB to connect to input devices such as keyboards and cursor control devices and output devices such as printers and speakers. Use of USB has also expanded beyond PCs to digital cameras, personal music players, game consoles, wireless phones, and so on. Thus, the functionality provided by USB may be found in a wide range of devices for a variety of situations that may range from business to personal uses. However, conventional USB is limited to wired applications which may limit the convenience of USB.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Wireless USB connection techniques are described. In one or more implementations, a Universal Serial Bus (USB) device includes one or more modules configured to communicate data over a wireless USB connection to another USB device. The wireless USB connection is implemented by mimicking a wired USB connection.

In one or more implementations, an interface is provided that is configured to be accessible to one or more applications to provide communicative coupling via a universal serial bus (USB) connection to a USB device. Data is communicated via the USB connection wirelessly to the USB device without making the one or more applications aware that the communicative coupling to the USB device is wireless.

In one or more implementations, a Universal Serial Bus (USB) host includes one or more modules to initiate a USB enumeration procedure to simulate a USB attach operation when a connect command is received wirelessly from a USB device or to simulate a USB detach operation when a disconnect command is received from the USB device via a wireless USB connection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 5 is an illustration of an example of an RTP header of FIG. 4 in greater detail.

DETAILED DESCRIPTION

Overview

The range of devices that are able to connect via USB is quite diverse. For example, devices such as PCs, cameras, modems, mass storage devices, card readers, and so on may each use USB to connect to another device. However, conventional USB is limited to wired connections, thereby limiting the convenience of USB to users.

Techniques are described to provide USB connectivity via a wireless connection. In an implementation, a USB cable that was previously utilized to connect USB devices is replaced with a wireless connection, e.g., a wireless connection in accordance with IEEE 802.11 (i.e., WiFi) or other wireless technologies, such as cellular technologies (e.g., 3G), Bluetooth, and so on. Additionally, this wireless connection may leverage underlying functionality used to provide USB to increase efficiency of a device and expand usefulness of the wireless connection. In this way, traditional applications and devices may leverage the wireless USB connection without being aware that a wireless connection is being used. For instance, the wireless USB connection may be configured such that drivers, firmware, and so on established for providing a conventional USB connection may also be used for the wireless USB connection without being reconfigured. Further discussion of a wireless USB connection and devices that may employ the wireless USB connection may be found in relation to the following sections.

In the discussion that follows, example operating environments are described that may incorporate the wireless USB connection techniques. Example methods are also described that may be employed in the example operating environments, as well as other environments. Thus, in instances in the discussion of the methods, reference will be made to the environments by way of example. Therefore, implementation of the methods is not limited to the environments and use of the devices is not limited to the methods.

Example Operating Environment

Figure 1:
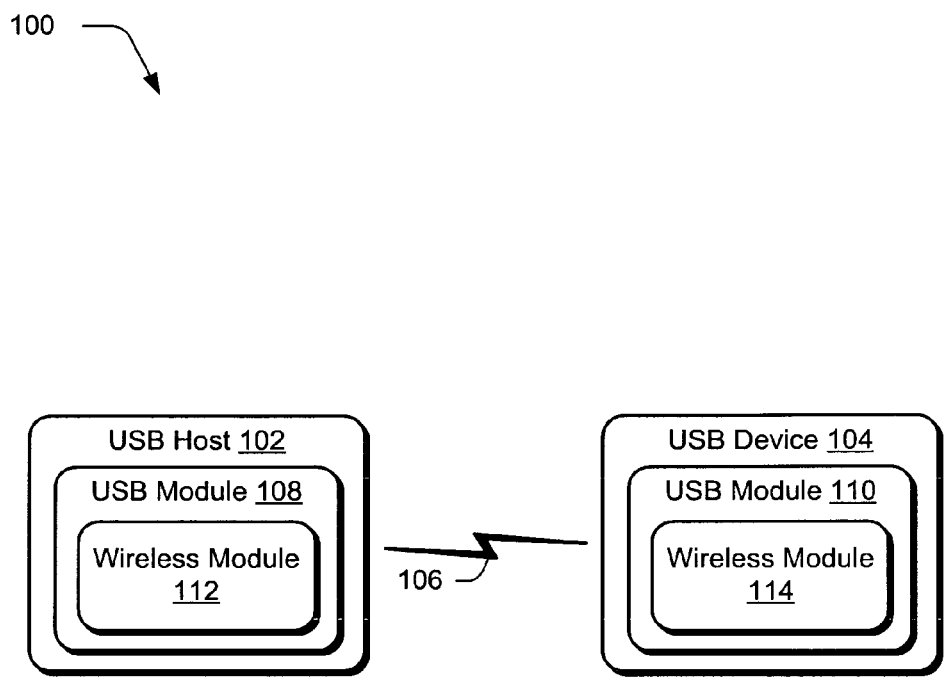
FIG. 1 is an illustration of an example implementation of an environment that includes a universal serial bus (USB) host that is communicatively coupled to a USB device using a wireless USB connection.

FIG. 1 illustrates an example implementation of an environment 100 that includes a universal serial bus (USB) host 102 that is communicatively coupled to a USB device 104 using a wireless USB connection 106. The USB host 102 and the USB device 104 are illustrated as including respective USB modules 108, 110 that are representative of functionality to provide and manage communication in accordance with USB.

USB follows a "host controlled" topology in which a single host (e.g., USB host 102) is responsible for control of the USB, e.g., to undertake transactions and schedule bandwidth. In some implementations, the USB may support a host negotiation protocol such that two or more devices may negotiate for the role of host. For example, the USB host 102 may be configured as a digital camera and the USB device 104 may be configured as a mobile phone that may negotiate for the role of a host. Once a host is determined, the device assuming the role of host is responsible for transactions and bandwidth usage of the USB.

Accordingly, the USB host 102 may be configured in a variety of ways, such as a desktop computer, server, laptop computer, a peripheral device (e.g., printer), and so on. Likewise, the USB device 104 may also be configured in a variety of ways. For example, device functionality of the USB device 104 may be configured to provide data storage (e.g., a USB data storage dongle), printing (e.g., as a photo printer), image capture (e.g., a digital camera), input (e.g., as a keyboard or mouse), and so on. Thus, the use of the term USB host 102 denotes the role of the underlying device in forming and/or maintaining a USB connection.

Although a USB host 102 and a single USB device 104 are illustrated, additional USB devices may also leverage the wireless USB connection 106, directly or indirectly. For example, the USB host 102 may include other USB devices that are connected to a USB of the USB host 102 directly via a wired connection. Accordingly, the USB module 110 of the USB device 104 may negotiate with the USB module 108 of the USB host 102 to communicate with one of the other USB devices. Once permission is granted, the USB device 104 may communicate with the other USB devices of the USB host 102 directly via the USB. The USB device 104 may also communicate indirectly through the USB module 108 of the USB host 102 with other devices that are not configured for communication via the USB, such as a processor and memory of the USB host 102.

The USB modules 108, 110 are further illustrated as including respective wireless modules 112, 114 that are representative of functionality to provide the wireless USB connection 106. For example, the wireless modules 112, 114 may include hardware (e.g., transmitters, receivers, antennas) and software (e.g., drivers) that are configured to provide wireless communication according to one or more protocols, such as, IEEE 802.11. By including the wireless modules 112, 114 within the functionality of the USB modules 108, 110, the wireless functionality may be provided without specially configuring devices and applications that are configured to avail themselves of USB. In other words, the USB modules 108, 110 may provide functionality of the wireless USB connection 106 without exposing particular protocols and other functionality used to provide the connection, further discussion of which may be found in relation to FIG. 2.

Generally, any of the functions described herein can be implemented using software, firmware (e.g., fixed logic circuitry), or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the wireless USB techniques described below are platform-independent, meaning that the techniques may be implemented on a variety of commercial computing platforms having a variety of processors.

Figure 2:
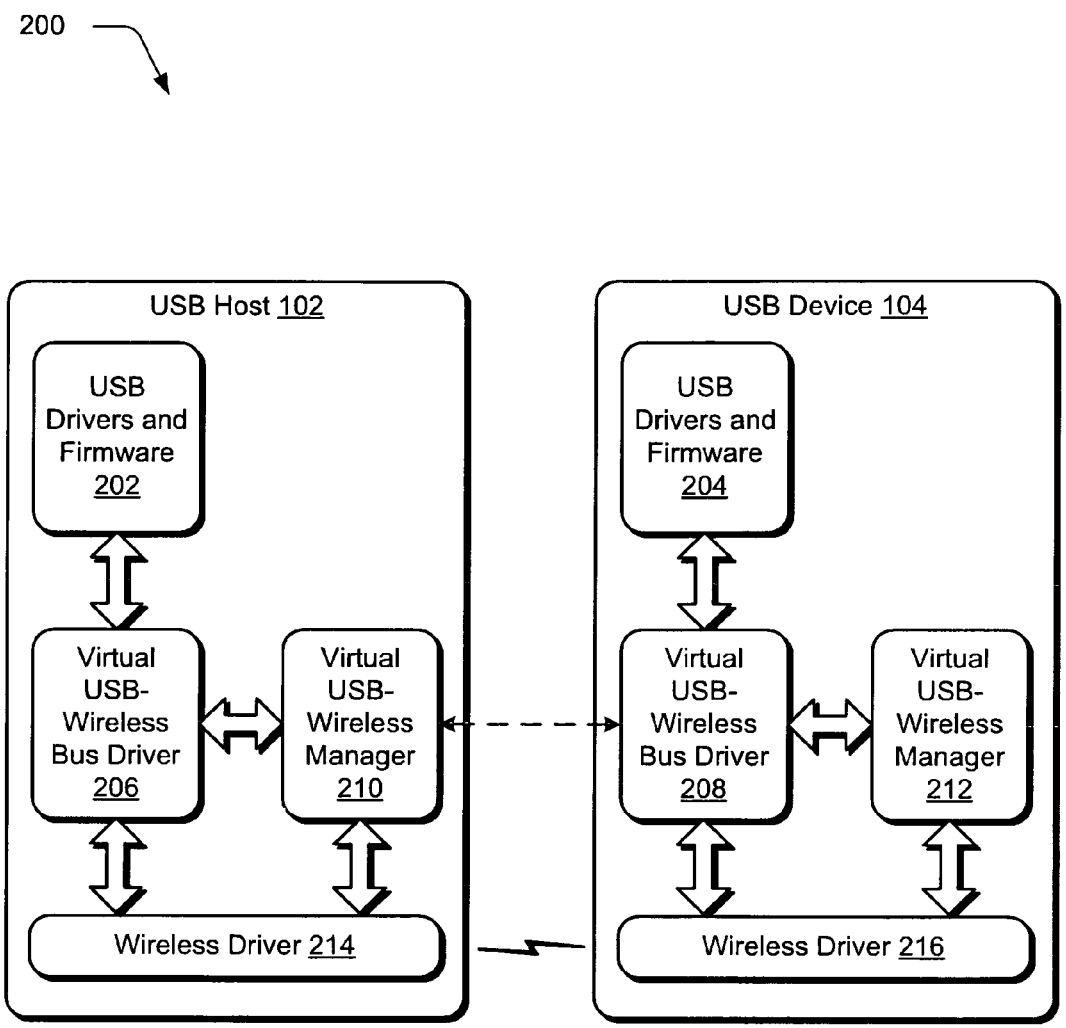
FIG. 2 is an illustration of a system in an example implementation of the USB host and the USB device of FIG. 1.

FIG. 2 illustrates a system 200 in an example implementation of the USB host 102 and the USB device 104 of FIG. 1. The USB host 102 and the USB device 104 are illustrated as including USB drivers and firmware 202, 204, virtual USB-wireless bus drivers 206, 208, virtual USB-wireless managers 210, 212 and wireless drivers 214, 216, respectively.

The USB drivers and firmware 202, 204 on the USB host 102 and USB device 104 may be implemented to simulate conventional USB functionality thereby ensuring backward compatibility by mimicking a conventional wired USB connection. For instance, the virtual USB-wireless bus drivers 206, 208 may implement a similar application programming interface (API) as would a legacy USB driver thereby appearing as a conventional wired USB connection to devices and/or software that are to utilize the connection even though a wireless connection is being utilized to communicate the data between devices. Likewise, the virtual USB-wireless bus drivers 206, 208 may implement a state machine to address a simulated USB enumeration procedure, e.g., to attach or detach the USB device 104 from the USB host 102, such that formation of a wireless connection appears similar to formation of a conventional wired USB connection to software and/or devices that are to utilize the wireless connection. A variety of other examples are also contemplated, such as, simulated read/write operations and so on.

The virtual USB-wireless manager 210 on the USB host 102 is configured to generate a corresponding attach or detach command to the virtual USB-wireless bus driver 206 to start a USB enumeration procedure as previously described. For instance, when the virtual USB-wireless manager 210 receives the "connect" or "disconnect" command from the USB device 104, the corresponding command may be generated. In an implementation, the virtual USB-wireless manager 210 verifies the validity of the command, such as via an encryption key that was previously provided to the USB device 104. Further discussion of the encryption key may be found in relation to FIG. 3.

The virtual USB-wireless manager 212 on the USB device 104 may be configured to implement an interface that mimics (e.g., substantially matches) an interface of a legacy USB driver. For example, the virtual USB-wireless manager 212 may implement a state machine to provide a simulated USB enumeration procedure as previously described. Additionally, the virtual USB-wireless manager 212 may call a corresponding wireless related read/write operation of the wireless driver 216 to complete a USB read/write operation issued from the USB drivers and firmware 204.

The virtual USB-wireless manager 212 on the USB device 104 may be configured to output a user interface to provide a variety of functionality. For example, the user interface may be used to allow an end user to specify the USB host 102 from a plurality of other available USB hosts. This may be done in a variety of ways, such as by specifying a host name, IP address with a port number by which a TCP/IP connection may be established, and so on. The user may also input an encryption key to allow some security check when trying to connect to the USB host 102.

In an implementation, the USB device 104 includes a connect button (which may be implemented in hardware and/or in a display of a user interface) that is operable to initiate the wireless connection. The process may simulate a USB attach, thereby initiating the USB enumeration procedure. Additionally, a user may identify which port the USB host 102 "should listen to" to form the wireless connection with the USB device 104.

After the USB enumeration procedure is initiated, the USB host 102 may recognize the USB device 104. When a user decides to disconnect the USB device 104 (e.g., by pressing a dedicated disconnect button, by repressing the attach button, and so on), a USB "detach" may be simulated. Thus, a user at the USB host 102 may see the USB device 104 disappear from a user interface output at the USB host 102. In this implementation, the command may be sent via the wireless USB connection 106 such that the virtual USB-wireless bus driver 206 may interpret the commands and react accordingly.

Figure 3:
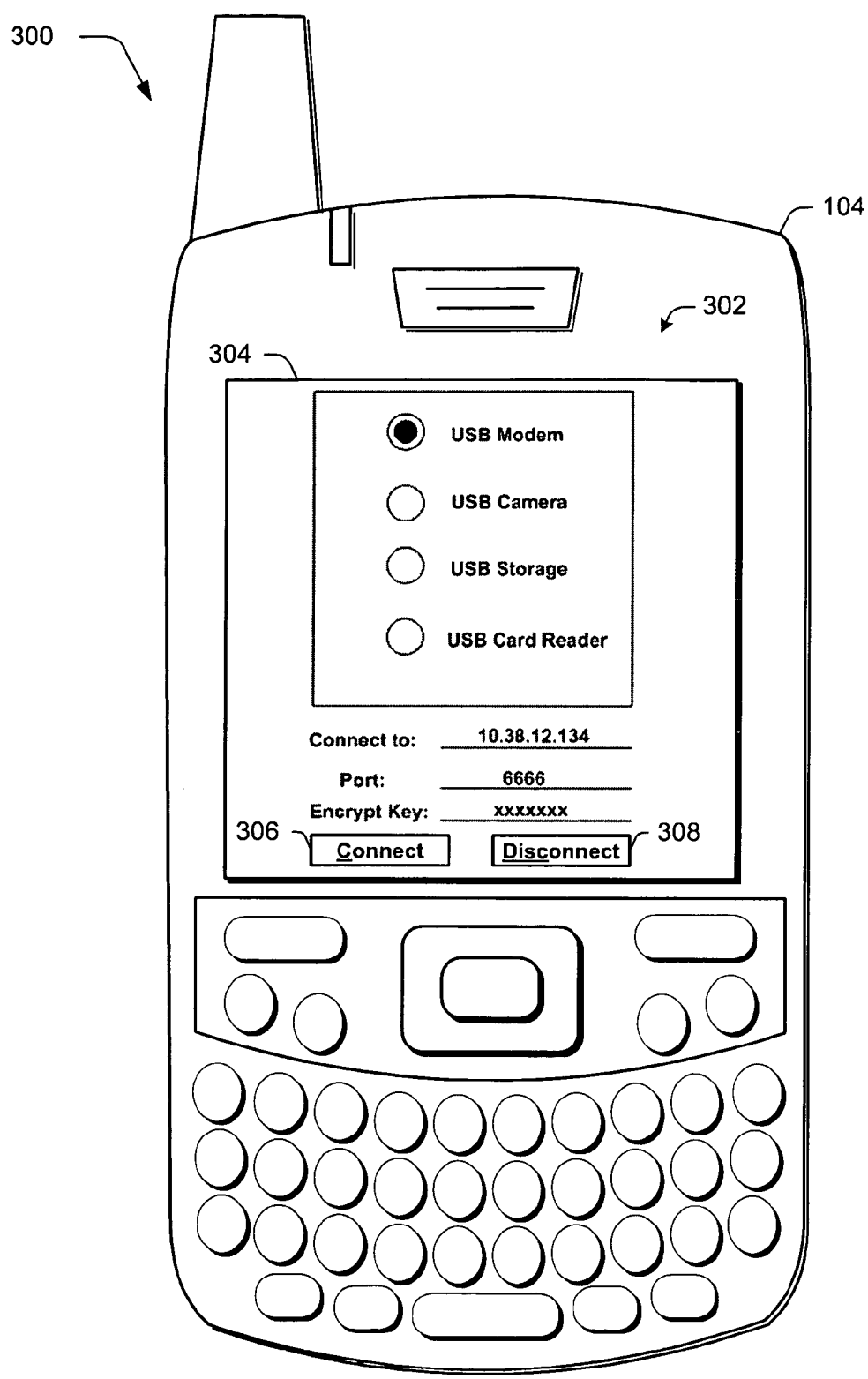
FIG. 3 is an illustration of an example user interface that may be output by a virtual USB-wireless manager to initiate a USB connect/disconnect and USB enumeration procedure.

FIG. 3 depicts an example user interface 302 that may be output by the virtual USB-wireless manager 212 to initiate a USB connect/disconnect and USB enumeration procedure. In the illustrated instance, the USB device 104 is configured as a wireless phone. A user interface 302 is output on a display device 304 of the USB device 104 and includes a plurality of options to specify which of a plurality of USB hosts 102 the USB device 104 is to attach to, examples of which are illustrated as "USB Modem," "USB Camera," "USB storage," and "USB Card Reader."

The user interface 302 also includes a portion to specify a particular IP address, a port, and an encryption key as previously described for forming the wireless connection. The encryption key may be entered in a variety of ways, such as manually by a user, automatically by device, and so on. For example, the user interface 302 may output an option via which the user may manually specify a particular encryption key. In another example, the encryption key may be automatically generated by the USB device 104.

Additionally, the illustrated user interface 302 includes a display of connect 306 and disconnect 308 buttons to initiate and terminate the wireless USB connection 106 of FIG. 1, respectively. As previously described, a variety of other implementations are also contemplated, such as, dedicated hardware buttons, sharing of a single button (e.g., press to connect and press again to disconnect), and so on. A variety of different types of data may leverage the wireless USB connection described herein, an example of which may be found in relation to the following section.

Media Implementation Example

Figure 4:
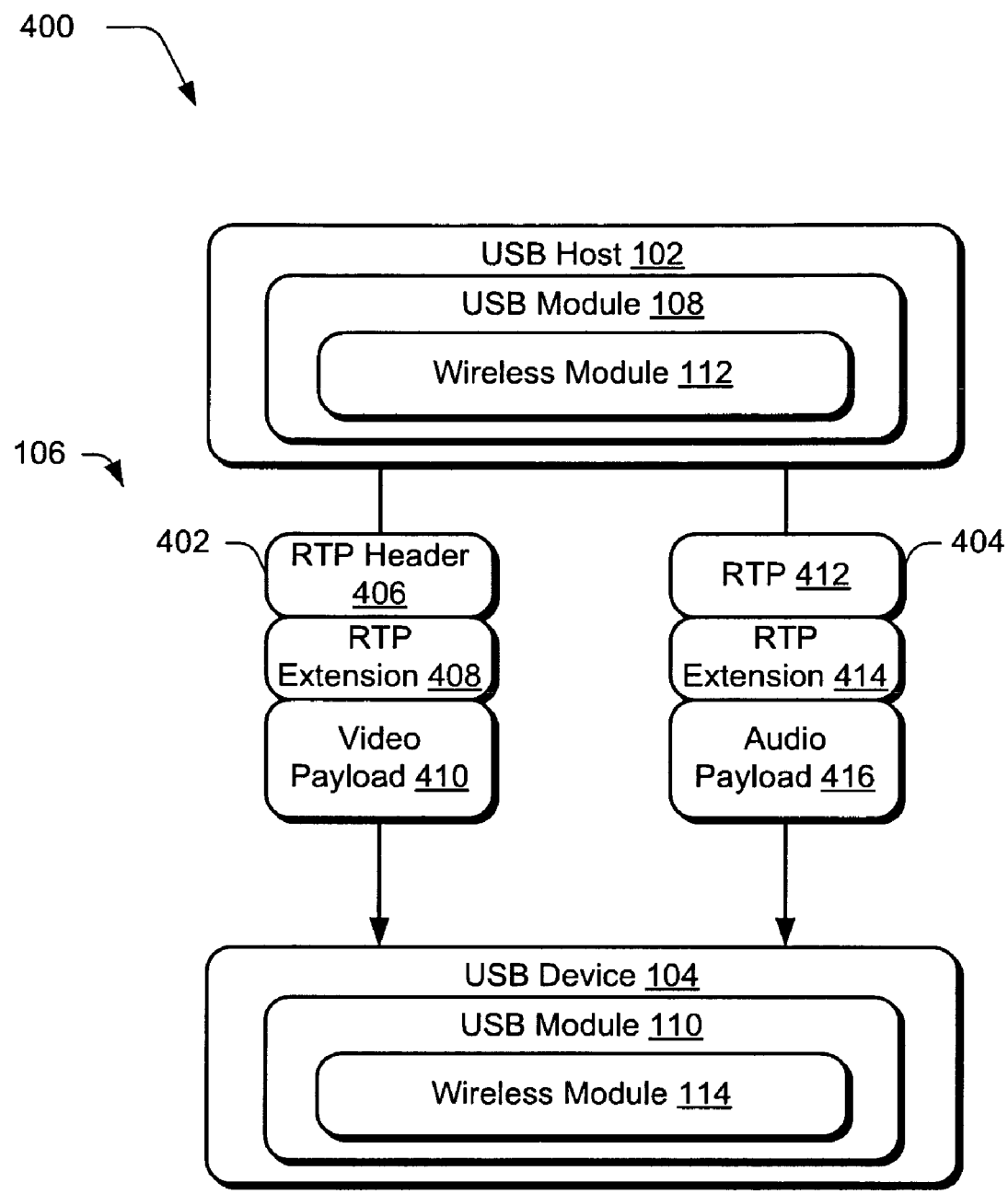
FIG. 4 is an illustration of a system in an example implementation in which a wireless USB connection of FIG. 1 is utilized to communicate streams of video and audio from the USB host to the USB device.

FIG. 4 depicts a system 400 in an example implementation in which the wireless USB connection 106 of FIG. 1 is utilized to communicate streams of video and audio data from the USB host 102 to the USB device 104. A variety of different protocols may be utilized to communicate data via the wireless USB connection 106. For instance, protocols may be chosen to achieve a relatively low packet header and control path overhead, an ability to transport a timestamp, sequence number and frame details such as a start of frame indicator, and so on.

In the illustrated example, a RTP (Real Time Protocol) is selected to transport different media streams over USB. Additionally, since the wireless USB connection 106 may act as a USB wire replacement, UDP (User Datagram Protocol) may be used as a layer 3 protocol such that an RTP header is communicated over the UDP. In an implementation, separate streams are used for audio and video data between the USB host 102 and the USB device 104, which are illustrated as a video stream 402 and an audio stream 404.

RTCP (Real Time Control Protocol) may also be used with RTP. For example, RTCP may be utilized to determine a quality of service (QoS) of the RTP streams, gather statistics and a source description, and so on. However, the wireless connection may also be implemented without this functionality.

The video stream 402 is illustrated as communicating a packet that includes an RTP header 406, an RTP extension 408 and a video payload 410. Likewise, the audio stream 404 is illustrated as communicating a packet that includes an RTP header 412, an RTP extension 414 and an audio payload 416. Further discussion of the RTP header 406 and the RTP extension 408 may be found in relation to the following figures.

FIG. 5 shows an example of the RTP header 406 of FIG. 4 in greater detail. To form the wireless USB connection using RTP in the following example, each USB packet is appended with a basic 12-byte RTP header. Additional headers may also be included, which may be based on whether audio or video data (e.g., JPEG) is being communicated. The RTP header 406 of FIG. 5 is illustrated as including a variety of different portions, each of which is detailed in a respective section below.

Version (V) 502: 2 Bits

This field identifies the version of RTP, which is set to 2 in the illustrated example.

Padding (P) 504: 1 Bit

If the padding field is set, the packet contains one or more additional padding octets at the end which are not part of the payload, otherwise the bit is set to 0.

Extension (X) 506: 1 Bit

If the extension field is set, the fixed header is followed by a single header extension, e.g., the bit is set to 1.

CSRC Count (CC) 508: 4 Bits

The CSRC count contains the number of CSRC identifiers that follow the fixed header, otherwise the CSRC count 508 field is set to 0.

Marker (M) 510: 1 Bit

The interpretation of the marker is defined by a traffic profile. For JPEG, this is set to 1 when the packet contains the EOI (End of Image).

Payload Type (PT) 512: 7 Bits

This field identifies the format of the RTP payload and determines its interpretation by the application. In this example, the payload type 512 is set to a type that is not assigned to other previously-defined types, e.g., to 34.

Sequence number 514: 16 Bits

The sequence number 514 increments by one for each RTP data packet sent. The sequence number 514 has a variety of different uses, such as for use by a receiver to detect packet loss and to restore packet sequence. The initial value of the sequence number may be set as 0.

Timestamp 516: 32 Bits

The timestamp 516 reflects a sampling instance of a first octet in an RTP data packet. The sampling instance may be derived from a timestamp of a clock of a JPEG codec.

SSRC 518: 32 Bits

The SSRC 518 field identifies a synchronization source. This identifier may be chosen randomly to increase a likelihood that two synchronization sources within the same RTP session do not have the same SSRC 518 identifier. It should be readily apparent that a variety of different RTP headers 406 may be employed to provide the USB wireless connection techniques. Accordingly, the previous fields of the RTP headers 406 above are but a few of a variety of contemplated examples.

Figure 6:
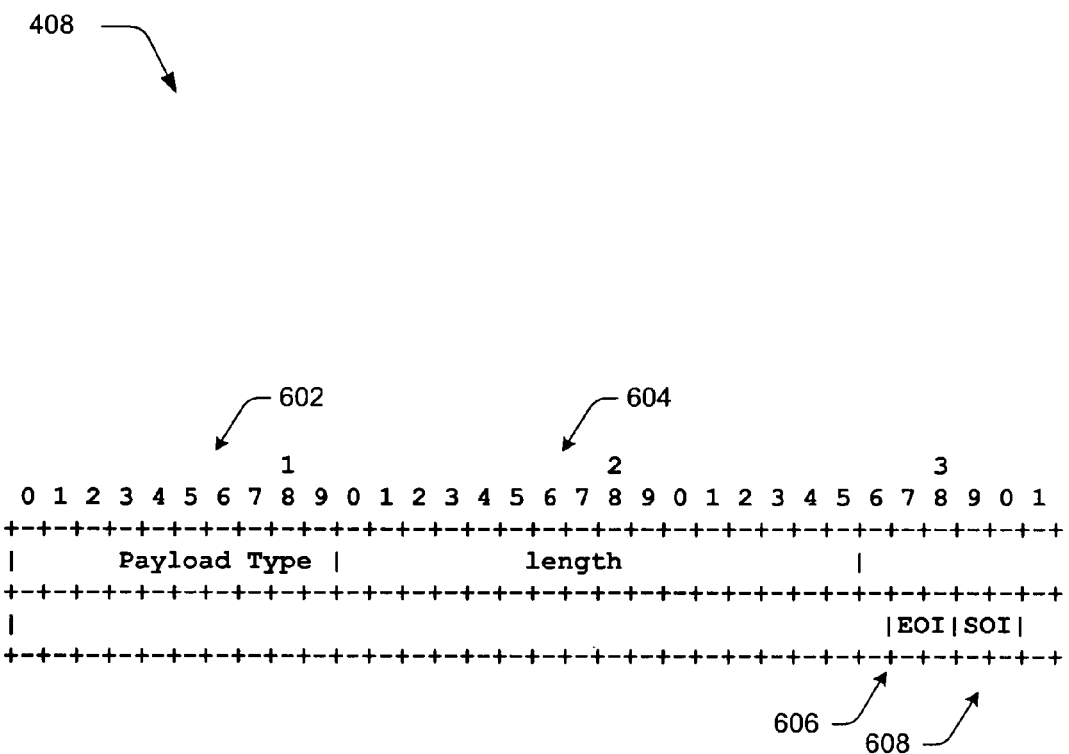
FIG. 6 is an illustration of an example of an RTP extension header of FIG. 4 in greater detail.

FIG. 6 illustrates an example of an RTP extension 408 to the RTP header 406 of FIG. 4 in greater detail. As was described in relation FIG. 4, the USB packet may include an RTP header 406 as was described in relation to FIG. 5. The USB packet may also include an RTP extension 408 that may further describe the packet and its content, examples of which follow.

Payload Type 602: 8 Bits

The payload type 602 field may be defined in the same way as the payload types 512 defined for RTP header 406. For a JPEG frame, for instance, the value is 26. For audio frames, the payload type 602 may depend on a codec used.

Length 604: 16 Bits.

The length 604 field describes a number of bits included in the RTP extension 408. For example, the length 604 may be determined by counting a number of 32-bit words in the RTP extension 408, excluding a four-octet extension header (therefore zero is a valid length).

SOI 606 and EOI 608

The Start of Image (SOI) 606 field indicates a start of a payload and the End of Image (EOI) field indicates an end of the payload, which is an image in this instance. It should be readily apparent that a variety of different RTP extensions 408 may be employed to provide the USB wireless connection techniques. Accordingly, the previous portions of the RTP extensions 408 above are but a few of a variety of contemplated examples.

Figure 7:
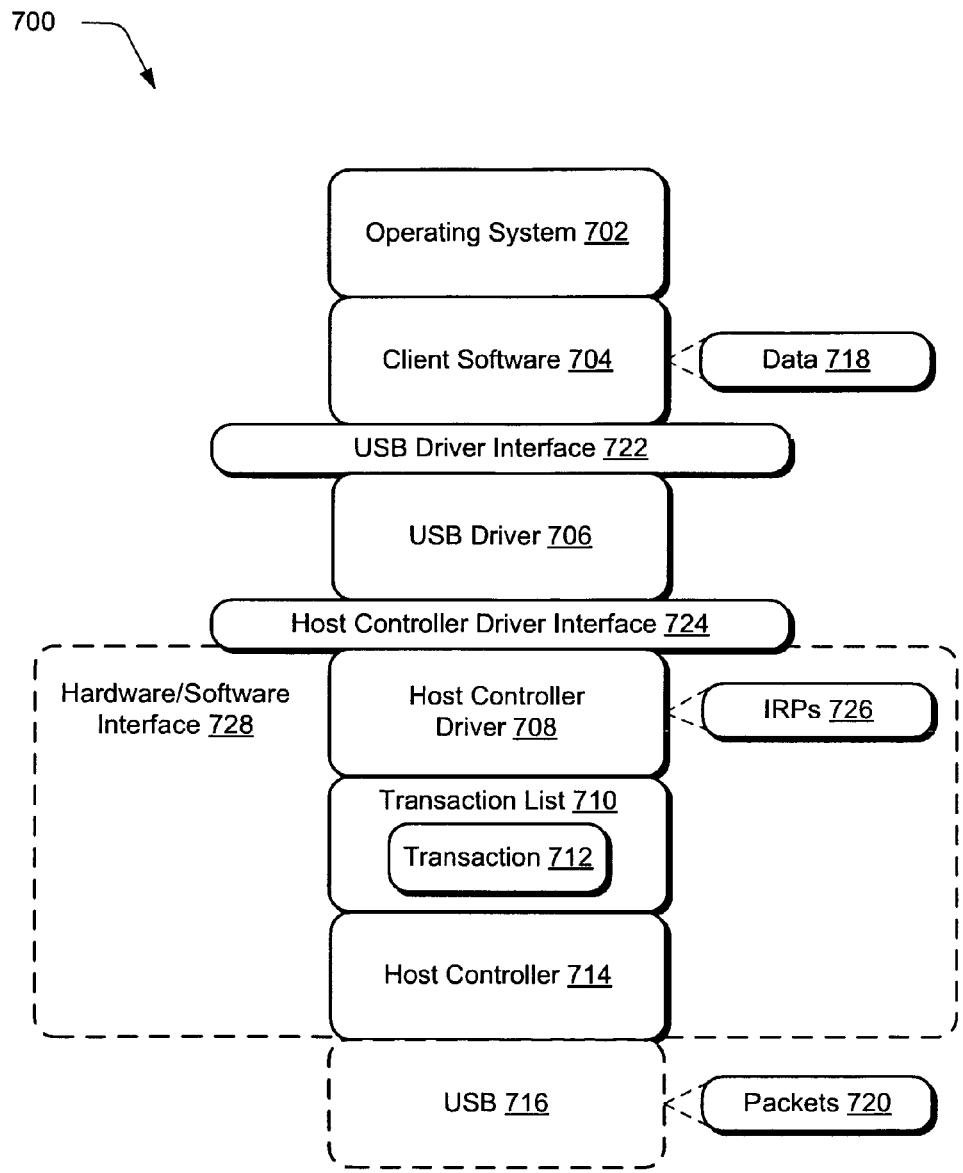
FIG. 7 is an illustration of a system in an example implementation that illustrates example software/hardware partitioning.

FIG. 7 depicts a system 700 that illustrates example software/hardware partitioning. The system 700 is illustrated as including examples of applications including an operating system 702 and client software 704. The system is also illustrated as including a USB driver 706, a host controller driver 708, a transaction list 710 having one or more transactions 712, a host controller 714 and a USB 716. The client software 704 interfaces with the operating system 702 and originates the data 718 in this instance that is to be communicated via the USB 716 as packets 720.

The USB driver 706 communicates with the client software 704 via a USB driver interface 722. The USB driver 706 is configured to ensure that a desired device configuration may be accommodated on the USB 716. The USB driver 706 may also be configured to approve an endpoint, packet size, transfer type, transfer period, and so on. In an implementation, the USB driver 706 is configured specific to the operating system 702.

The host controller driver 708 communicates with the USB driver 706 via a host controller driver interface 724. The host controller driver 708 is configured to add I/O Request Packets 726 from a respective transaction 712 in the transaction list 710. When an IRP has completed transfer, the host controller driver 708 informs the client software 704.

The host controller 714 in the illustrated example is implemented in hardware. The host controller 714 is configured to control a USB protocol utilized over the USB 716, e.g., to handle packet 720 retries, transfers, CRC, and so on. Thus, in this example, the host controller driver 708 and the host controller 714 provide the hardware/software interface 728 between the USB 716 and the client software 704.

Figure 8:
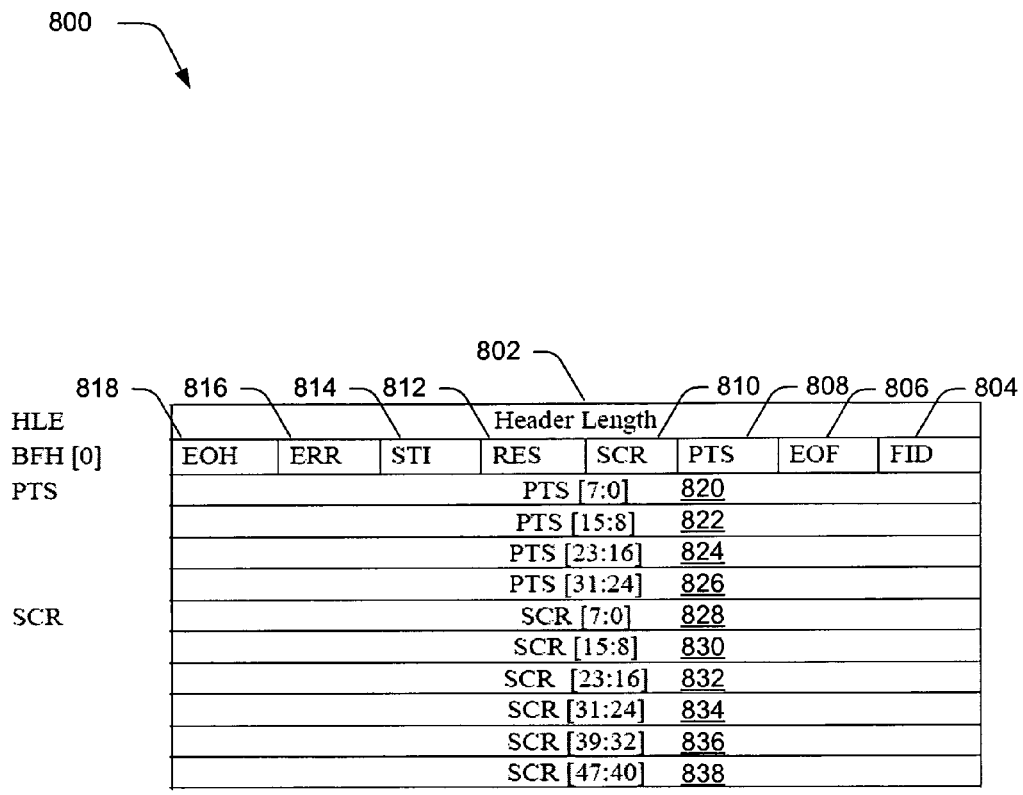
FIG. 8 is an illustration of an example implementation of a video header that may be utilized to communicate over a wireless USB connection.

FIG. 8 depicts an example implementation of a video header 800 that may be utilized for communication over a wireless USB connection. To transmit over the wireless USB connection, video packets are appended with the video header 800 before transmission. In an implementation, the video header 800 is appended to the start of each video payload packet (e.g., 1023 byte packets).

An example format of the video header 800 as illustrated in FIG. 8 includes the following fields. The header length 802 is the length of the header in bytes. The FID 804 is a bit toggles at start of each frame and is used to determine a start of a new frame for use by a higher layer protocol. The EOF 806 (End of Frame) is used by a higher layer protocol. The PTS 808 indicates presence of a presentation time stamp. The SCR 810 indicates presence of a source clock. The RES 812 field is reserved. The STI 814 field indicates whether the payload is a still image. ERR 816 is an error bit field, with EOH 816 indicating an end of the header.

The PTS 820-826 (presentation time stamps) are time stamps provided by a source clock at the start of a video frame and remain the same for each packet of that frame. At least one of the SCR 828-838 (source clock timestamps) contain a timestamp of the source clock before the packet was transmitted over the USB. Another one of the SCRs 828-838 may contain a 1 Khz counter value. This field is typically used by chipset implementations that can trigger on SOF but cannot accurately obtain a frame number.

When the packet is to be transmitted using a layer 3 protocol, the USB video header may be removed before sending the packet to a next stage in the data path. For example, a video header associated with a video payload may be replaced with a protocol header obtained from a protocol stack. The protocol header may then be used to transfer the payload over a wireless interface. In another implementation, however, the video header may be retained, e.g., appended to the protocol header, as a part of the payload, and so on. Although replacement of the USB header has been described in relation to video data, a variety of different types of headers may be replaced.

Example Methods

Figure 9:
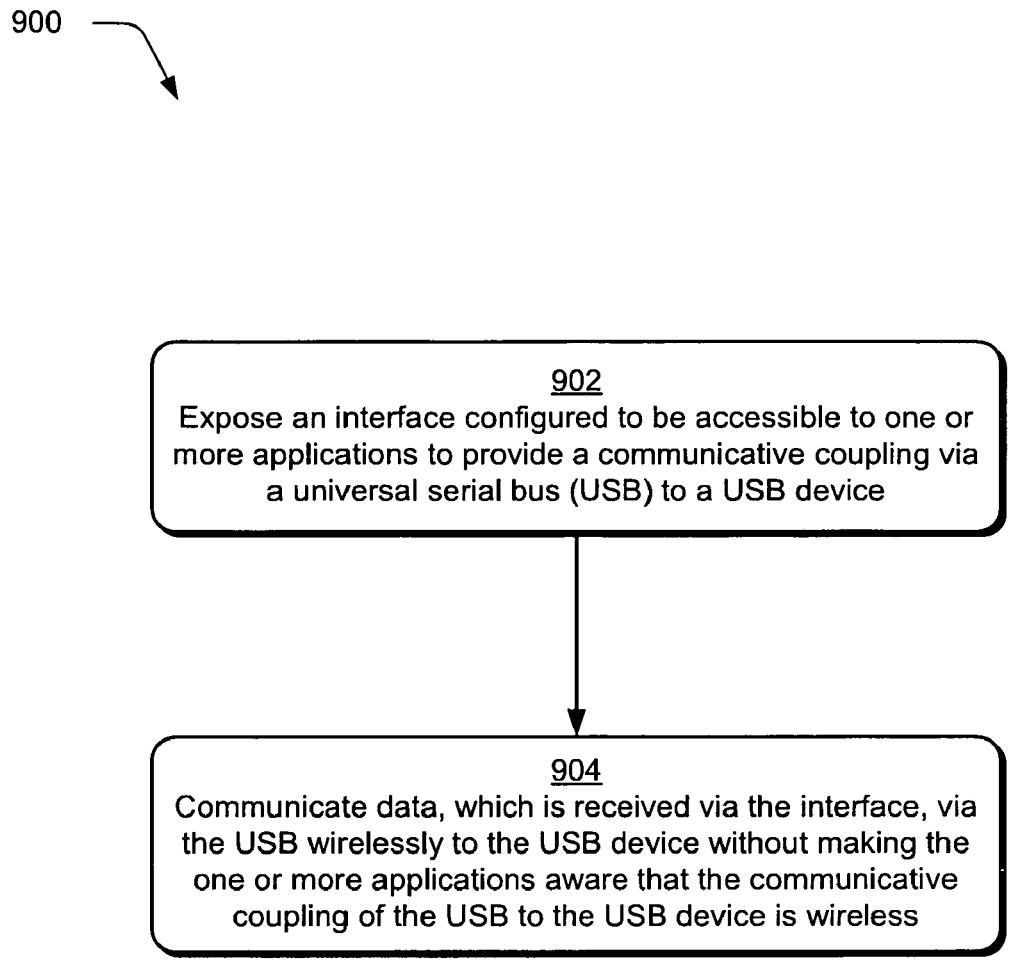
FIG. 9 is a flow diagram that depicts a method in an example implementation in which an interface is exposed to communicate data over a wireless USB connection.

FIG. 9 depicts a method 900 in an example implementation in which an interface is provided to communicate data over a wireless USB connection. The method may be implemented utilizing the previously described systems and devices, as well as other systems and device subsequently described. Aspects of the method may be implemented in hardware, firmware, software, or a combination thereof. The method is shown as a set of blocks that specify operations performed by one or more devices and are not necessarily limited to the orders shown for performing the operations by the respective blocks.

An interface is provided that is configured to be accessible to one or more applications to achieve communicative coupling via a universal serial bus (USB) to a USB device (block 902). For example, the USB driver 706 may provide a USB driver interface 722 to applications such as client software 704, an operating system 702, and so on.

In an implementation, the USB driver interface 722 mimics a conventional wired USB interface. In this way, applications (e.g., the client software 704) that are configured to communicate with a conventional wired USB interface may interact with the USB driver interface 722 without being specially configured to do so. Thus, the USB driver interface 722 may achieve backward compatibility with conventional devices and applications.

Data, which is received via the interface, is communicated via the USB wirelessly to the USB device without making the one or more applications aware that the communicative coupling of the USB to the USB device is wireless (block 904). Continuing with the previous example, because the USB driver interface 722 mimics a conventional wired USB interface from a point-of-view of the client software 704, interaction with the wireless USB may be performed using commands, protocols, and procedures of a conventional wired USB interface with the benefits of a wireless connection. Thus, the client software 704 may avail itself of a wireless connection without being aware that the connection is wireless. A variety of other examples are also contemplated as previously described.

Device Implementation Example

Figure 10:
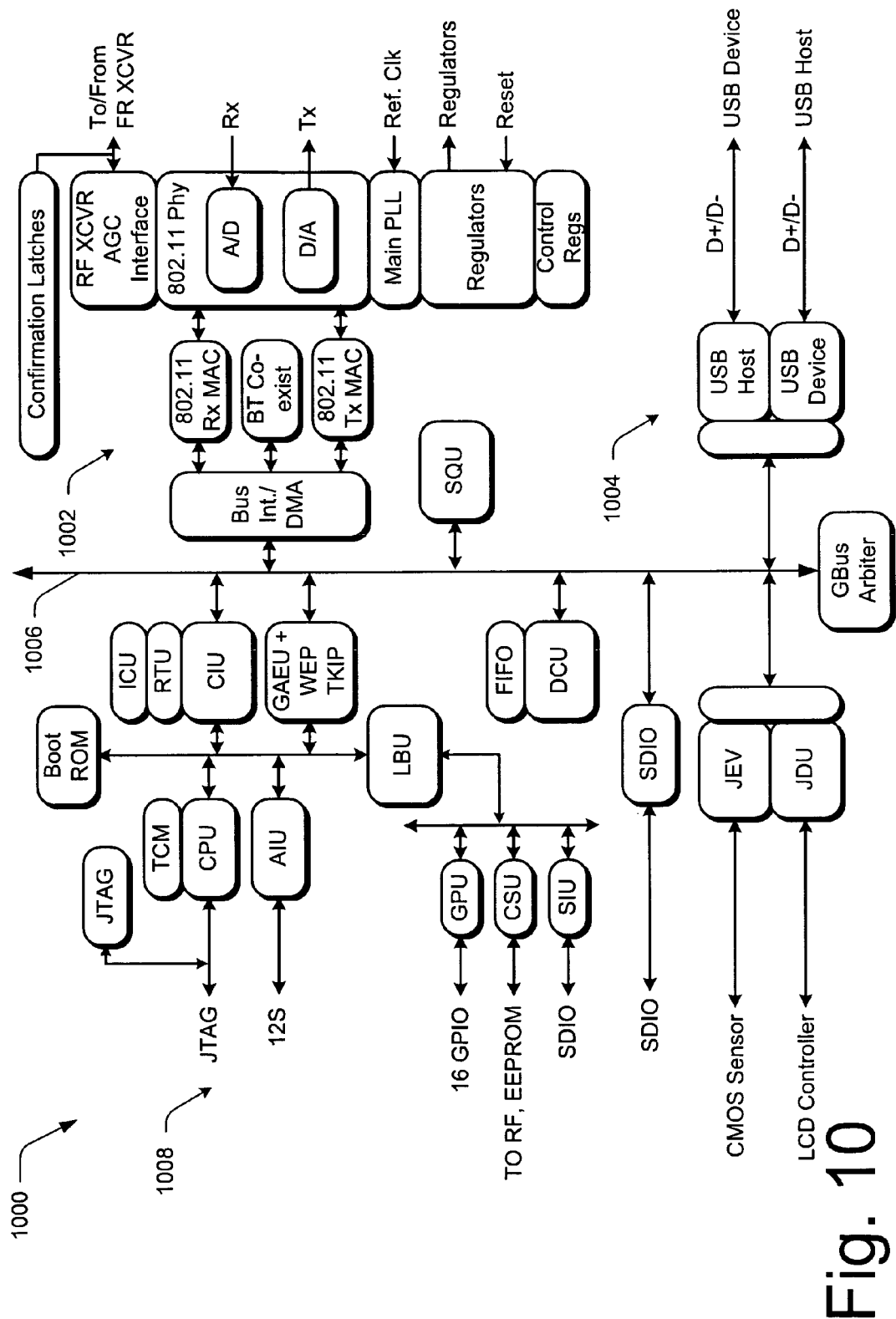
FIG. 10 is an illustration of an example of a system on a chip (SoC) that is configured to provide wireless connection for USB in a video implementation.

FIG. 10 depicts an example system on a chip (SoC) 1000 that is configured to provide wireless connection for USB in a video implementation. The SoC 1000 includes a portion 1002 to provide wireless connectivity, which in this instance complies with one or more IEEE 802.11 standards, although other examples are also contemplated. Another portion 1004 is configured to provide a wired USB connection. The portions 1002, 1004 are communicatively coupled via a graphics bus 1006 with a graphics portion 1008 of the SoC 1000.

USB may be utilized to transmit different amounts of data, including high bandwidth applications such as video data being transmitted from a capturing device (e.g., a web camera) and sent over USB to a display or storage device, e.g., a personal computer. Although an example SoC 1000 is illustrated, it should be readily apparent that the techniques described herein may be implemented in a variety of other way, such as by multiple integrated circuits, software, and so on.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A Universal Serial Bus (USB) device comprising:
   a USB driver configured to provide an interface for software of the USB device to communicate data;
   a wireless driver associated with a wireless module, the wireless driver configured to communicate data over a wireless connection of the wireless module; and
   one or more modules configured to communicate data of the USB driver via the wireless driver over the wireless connection to another wireless USB device effective to implement a wireless USB connection; wherein the wireless USB connection appears as a wired USB connection to the software of the USB device.

2. The USB device as described in claim 1, wherein the one or more modules include a driver and the interface is implemented by the driver.

3. The USB device as described in claim 1, wherein the one or more modules are configured to initiate a USB enumeration procedure to form the wireless USB connection with the other wireless USB device when a connect command is received wirelessly from the other wireless USB device.

4. The USB device as described in claim 1, wherein the one or more modules are configured to encapsulate packets of the data associated with the USB driver using internet protocol (IP) headers.

5. The USB device as described in claim 1, wherein the wireless USB connection is implemented using one or more IEEE 802.11 standards.

6. The USB device as described in claim 3, wherein the USB enumeration procedure simulates a USB attach operation, thereby appearing as a the wired USB connection to software of the USB device.

7. The USB device as described in claim 3, wherein the one or more modules are further configured to initiate the USB enumeration procedure to simulate a USB detach operation when a disconnect command is received wirelessly from the other wireless USB device.

8. The USB device as described in claim 3, wherein the one or more modules are further configured to verify validity of the connect command using an encryption key.

9. A method comprising:
   providing an interface configured to communicatively link a universal serial bus (USB) driver and a wireless driver associated with a wireless module effective to implement a wireless USB connection capable of communicating data of the USB driver via the wireless module, the interface accessible to one or more applications to provide communicative coupling to a wireless USB device via the wireless USB connection; and
   communicating data via the wireless USB connection to the wireless USB device without making the one or more applications aware that the communicative coupling to the wireless USB device is wireless.

10. The method as described in claim 9, wherein the interface simulates a wired USB interface such that the data is communicated via the wireless USB connection to the wireless USB device without making the one or more applications aware that the communicative coupling to wireless the USB device is wireless.

11. The method as described in claim 9, wherein the interface is implemented by a driver.

12. The method as described in claim 9, wherein the wireless module associated with the wireless driver communicates in accordance with one or more IEEE 802.11 standards.

13. The method as described in claim 9, further comprising initiating a USB enumeration procedure to simulate a USB attach operation to form the communicative coupling.

14. The method as described in claim 9, further comprising initiating a USB enumeration procedure to simulate a USB detach operation to end the communicative coupling.

15. A Universal Serial Bus (USB) host comprising:
   a USB driver configured to provide an interface for software of the USB host to communicate data;
   a wireless driver associated with a wireless module, the wireless driver configured to communicate data over a wireless connection of the wireless module; and
   one or more modules configured to:
      provide an interface between the USB driver and the wireless driver for communicating data associated with the USB driver over the wireless connection to another wireless USB device effective to implement a wireless USB connection; and
      initiate a USB enumeration procedure to simulate a USB attach operation when a connect command is received wirelessly from the other wireless USB device or to simulate a USB detach operation when a disconnect command is received from the other wireless USB device via the wireless USB connection.

16. The USB host as described in claim 15, wherein the connect or disconnect command is manually initiated at the other wireless USB device.

17. The USB host as described in claim 15, wherein the one or more modules are further configured to verify validity of the connect or disconnect command based on an encryption key.

18. The USB host as described in claim 15, wherein the one or more modules are configured to encapsulate packets of the data associated with the USB driver using internet protocol (IP) headers.

19. The USB host as described in claim 18, wherein the encryption key is manually entered at the other wireless USB device via a user interface output at the other wireless USB device.

20. The USB host as described in claim 15, wherein the one or more modules include a driver and the interface is implemented with the driver such that an application that interacts with the USB driver is not aware that the USB wireless connection is wireless.

21. The USB host as described in claim 15, wherein the wireless USB connection complies with one or more IEEE 802.11 standards.

* * * * *